July 17, 1962  M. H. GROVE  3,044,741
VALVE CONSTRUCTION
Filed July 30, 1958  4 Sheets-Sheet 2
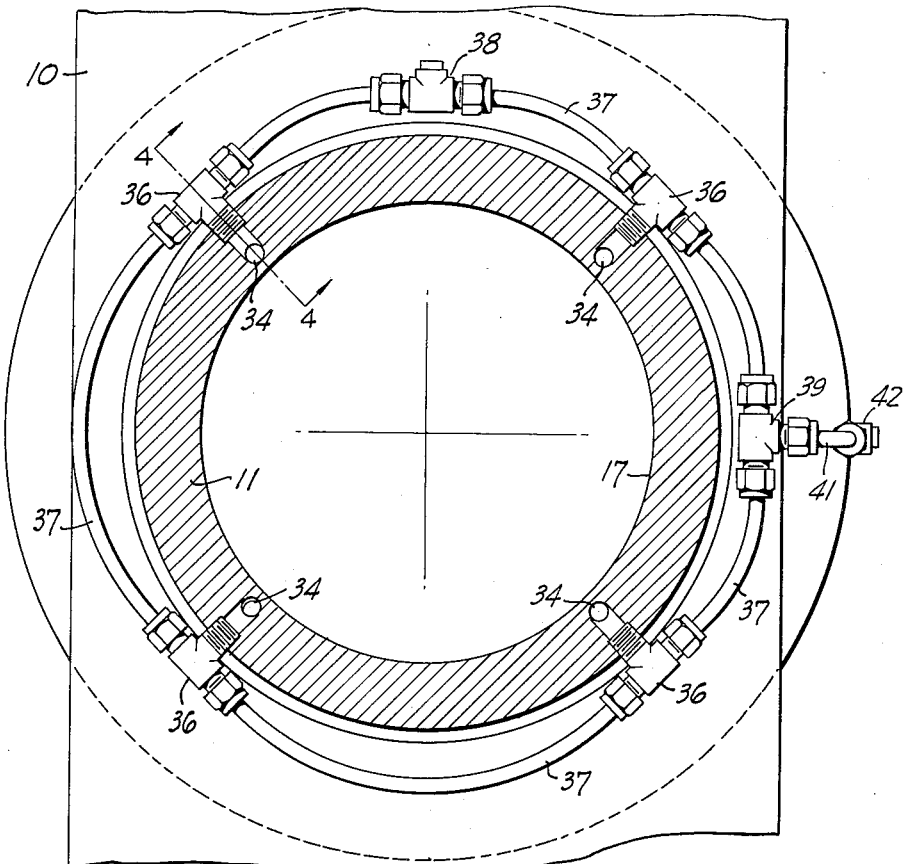
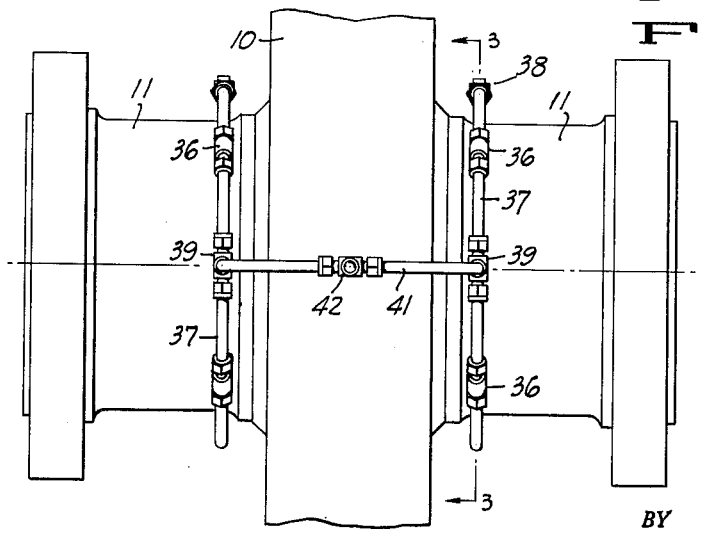
FIG_3_
FIG_2_
INVENTOR.
Marvin H. Grove
BY
Flehr & Swain
ATTORNEYS

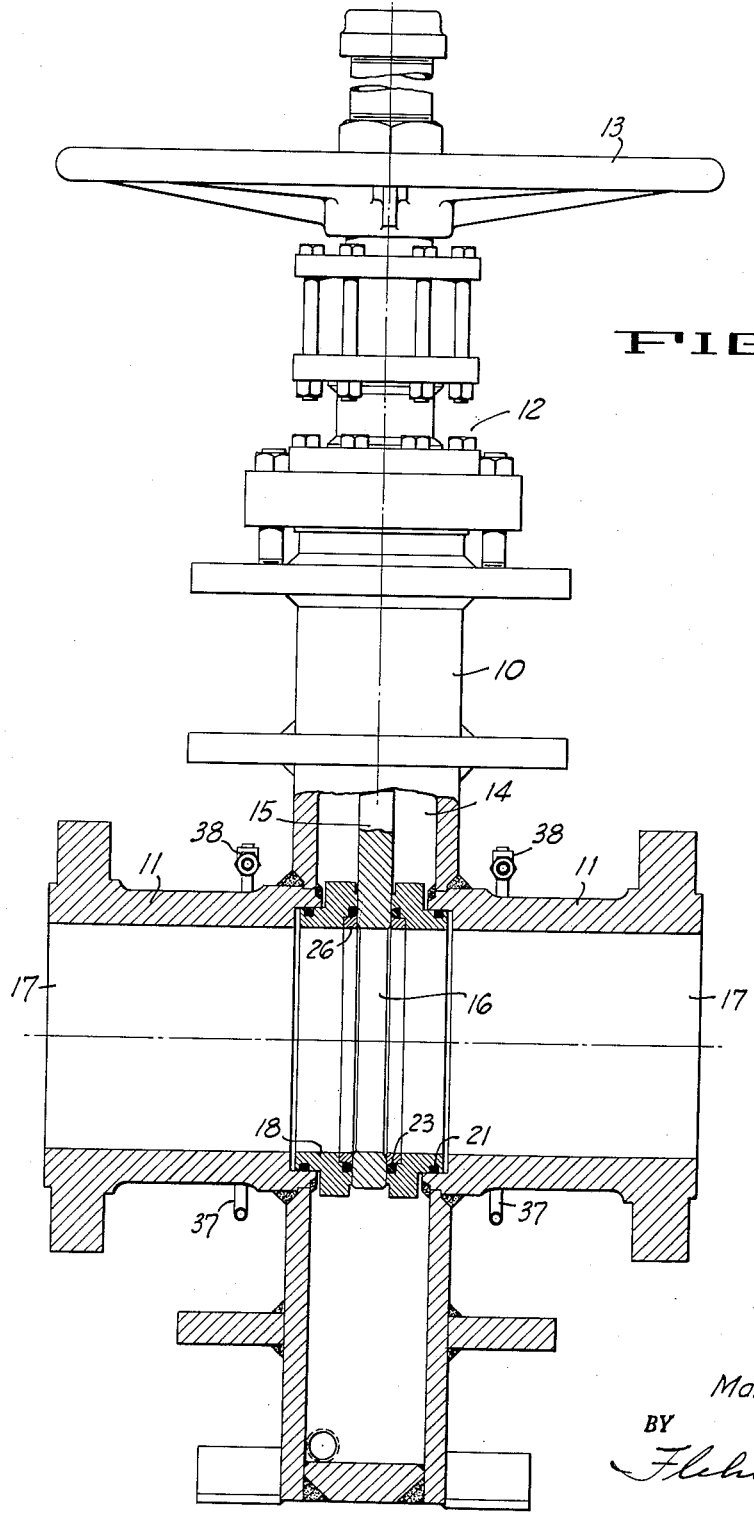

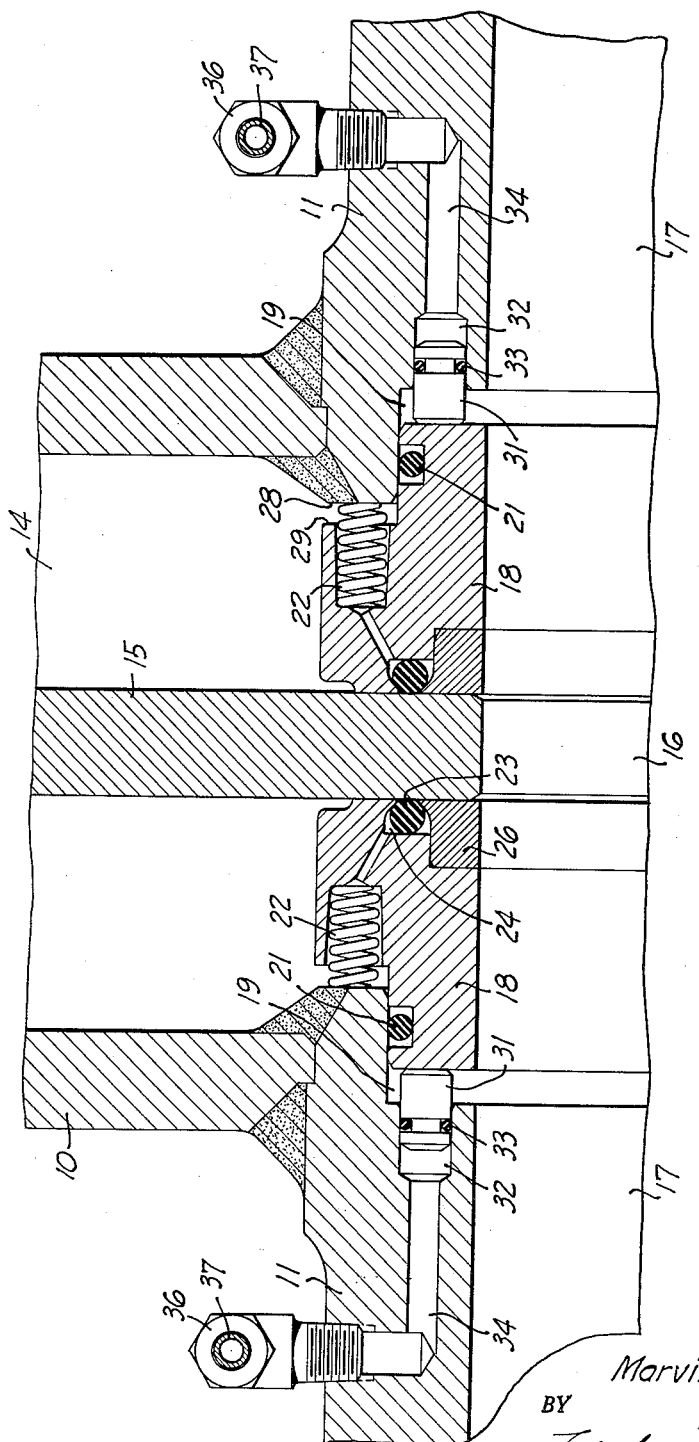

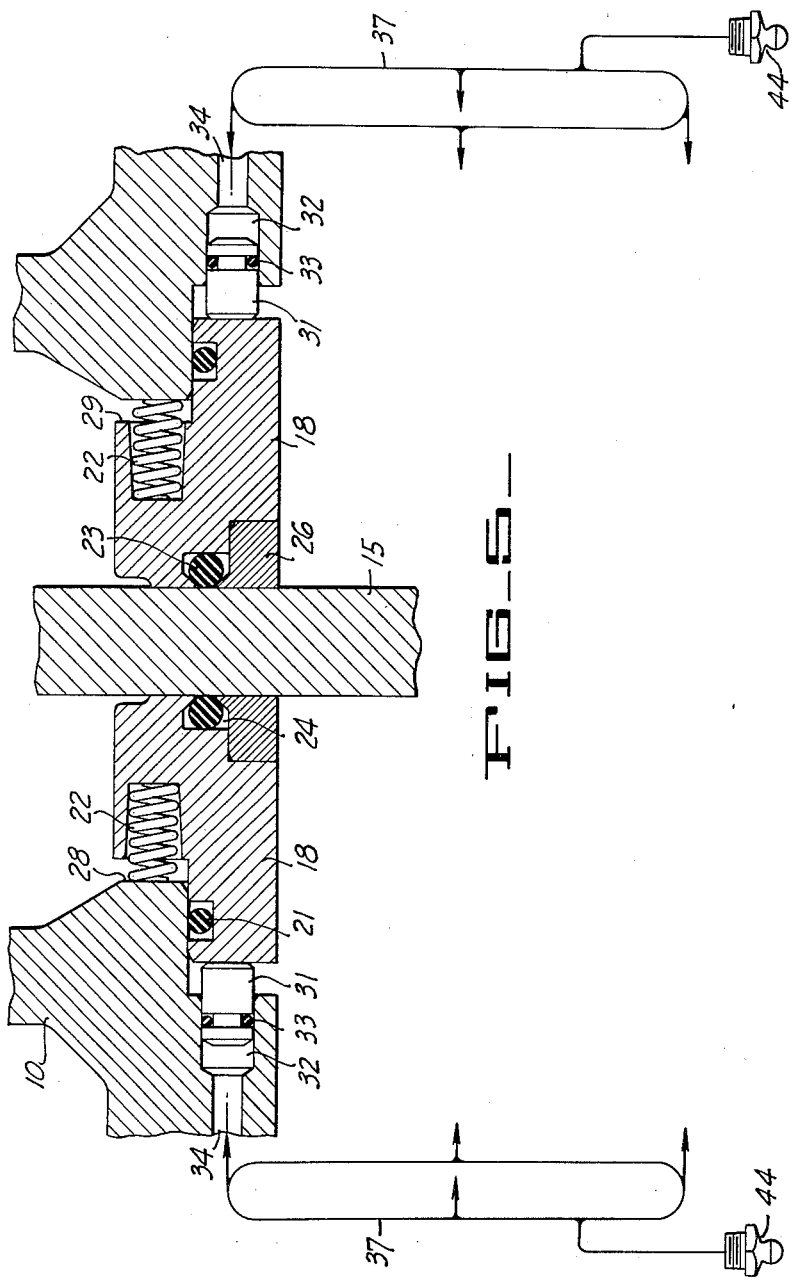

United States Patent Office 3,044,741
Patented July 17, 1962

3,044,741
VALVE CONSTRUCTION
Marvin H. Grove, Piedmont, Calif., assignor to Grove Valve and Regulator Company, Oakland, Calif., a corporation of California
Filed July 30, 1958, Ser. No. 752,110
3 Claims. (Cl. 251—54)

This invention relates generally to valves used for controlling the flow of various fluids, including gases and liquids.

In the construction of valves of the gate, plug, or ball types, the valve member is disposed within a body space between fluid passages, which connect with upstream and downstream piping. Seating means is disposed opposite sides of the valve member and serves to establish seals between the valve member and the adjacent portions of the body. In some instances, the seating means is permitted limited movement relative to the body whereby the valve member may move laterally relative to the body a limited amount. In Bryant, 2,810,543, such movable or floating means is provided, and the seating means in that instance is in the form of mounting rings which carry sealing elements of the resilient O-ring type. With a valve of the type disclosed in said Patent 2,810,543, fluid pressure serves to urge the valve member toward the downstream side, when the valve member is closed. In other words, the gate or other valve member presses against the adjacent surface of the downstream seat ring, and the seat ring in turn is urged into abutment with the adjacent portion of the valve body. Under such operating conditions, spring means associated with the seat rings serves to urge the upstream seat ring against the gate. When the pressure differential is reversed, some lateral movement of the gate occurs whereby it presses against the other seat ring, and that ring in turn is urged against the valve body. The seat ring which is now upon the upstream side follows movement of the gate, because of the action of the spring means.

Under certain service conditions, as for example, application of pressure differential in one direction over a long period of time, the seat ring on the downstream side may become fast to the body, whereby when a reversal of pressure differential occurs, such ring will not follow the gate, thus preventing maintenance of a seal upon the now upstream side and making it necessary to rely upon the seating means on the downstream side to hold the pressure differential. Also such separation of the seating rings from the gate, even if temporary, affords an opportunity for foreign material to find its way between the ring and the gate.

In addition to the usual operating conditions referred to above, the valve may at times be installed in a service where it is subject to periodic or recurring pulsations. Assuming that such pulsations cause recurring reversals of pressure differential upon the valve member, the result is a continual lateral movement of the valve member together with the seat rings, which tends to cause excessive wear.

In general, it is an object of the present invention to provide a valve of the above character having movable or floating seat rings, and which has means whereby when a ring tends to become jammed or fast with respect to the body, forces can be applied to effect its proper engagement with the valve member.

Another object of the invention is to provide a valve of the above character having novel means tending to hold the seat rings against the valve member.

Another object of the invention is to provide a valve of the above character having mechanical damping means tending to minimize recurring or periodic lateral movements of the valve member.

Additional objects and features of the invention will appear from the following description in which the preferred embodiments have been set forth in detail with the accompanying drawing.

Referring to the drawings:

FIGURE 1 is a side elevational view, partly in section, illustrating a valve of a gate type incorporating the invention.

FIGURE 2 is a side elevational detail, illustrating exterior hydraulic connections, as viewed from one side of the valve.

FIGURE 3 is a cross-sectional view taken along the line 3—3 of FIGURE 2, and on an enlarged scale.

FIGURE 4 is a cross-sectional detail taken along the line 4—4 of FIGURE 3, on an enlarged scale.

FIGURE 5 schematically shows an embodiment of the invention having a different arrangement of hydraulic connections.

The invention will be described as incorporated in a valve of the gate type, although it is to be understood that it can be employed with valves of the plug or ball type, provided with so-called floating seat rings. The gate valve of FIGURE 1 consists of a valve body 10, having hubs 11 adapted to be connected with associated upstream and downstream piping. The valve bonnet 12 incorporates suitable valve operating means, which in this instance is operated by the hand wheel 13.

Within the body space 14 there is a valve member 15 in the form of a flat gate. For open position, a port 16 in the gate is in registration with the flow passages 17. Seat rings 18 are provided upon opposite sides of the gate, and may be similar in construction to the rings disclosed in Patent 2,810,543.

As shown particularly in FIGURE 4, each ring 18 is slidably fitted within a body bore 19 and is provided with sealing means 21 of the O-ring type. Spring means, such as the coil springs 22, serve to urge the ring toward the gate 15. The seat rings carry resilient sealing means for making sealing contact with the side surfaces of the gate. Thus each ring carries a seal ring 23 of the O-ring type, disposed within an annular accommodating recess 24 that is defined in part by the inner seat ring 26. The arrangement and construction of these parts may be substantially the same as disclosed in said Patent 2,810,543.

The inner end of each hub 11 provides an abutment shoulder 28 which may be engaged by the shoulder 29 on the associated seat ring. Thus within the limits established by these abutting surfaces, the gate together with the seat rings may be moved in the direction of the flow passages 17.

The inner end of each hub also serves to carry a plurality of hydraulic jacks or rams. Each ram consists of plunger 31 fitted within a bore 32 and provided with suitable sealing member 33, such as one of the O-ring type. Plunger 31 is arranged to engage the adjacent end face of the seat ring 18. Ducts 34 serve to convey hydraulic fluid toward or away from the bores 32.

Suitable means is provided on each side of the valve for connecting together the associated ducts 34. Thus as shown in FIGURE 3, the fittings 36 communicate with the ducts 34 and are connected together with tubing 37. At one point the tubing is shown connected with a fitting 38 to facilitate filling the system with hydraulic fluid. At another point the tubing is connected with fitting 39, with each fitting connecting with the bypass tubing 41. A small flow control device 42 is interposed in the bypass tubing 41, and may for example be a small throttle valve. In addition to the parts just described, it will be evident that the hydraulic system may include a so-called accumulator, to limit the maximum permissible pressure.

Operation of the invention is as follows:
The hydraulic system is filled with the hydraulic fluid, such as glycerin, a suitable glycol, or an oil or grease taking care to eliminate substantially all air. Before the system is closed, some pressure can be applied whereby the plungers 31 apply forces at circumferentially spaced points about each of the seat rings 18, to urge these rings against the gate. Assuming then that the valve gate is in closed position, when a pressure differential is applied in one direction, the gate is moved a limited distance toward the downstream side until the surfaces 28 and 29 come into abutment. Movement of the downstream seat ring causes the corresponding plungers 31 to displace hydraulic fluid, with the result that this fluid surges through the bypass tubing 41 into the hydraulic devices on the upstream side, thus causing the plungers 31 on the upstream side to be projected a corresponding amount to insure proper follow up movement of the upstream seat ring. Should a reversal of pressure differential occur during operation, the gate moves toward its opposite limiting position with the result that the hydraulic fluid surges in the opposite direction, whereby the hydraulic plungers 31 again maintain proper follow up action for the upstream ring.

Should the valve be placed in a service where it is subject to pressure pulsations tending to cause recurring lateral movements of the valve gate, the hydraulic system just described can be employed to introduce mechanical damping tending to reduce such movements. The degree of damping can be controlled by adjusting the flow resistance offered by the throttle valve 42.

In some instances it may not be desirable or necessary to connect the two sides of the hydraulic system together in the manner described above. In such event the hydraulic system can be modified in the manner shown in FIGURE 5. The tubing 37 in this instance is connected with separate fittings 44 whereby hydraulic fluid can be supplied to one side or the other of the valve. Thus, if it should appear that the valve is not operating properly, because one of the seat rings has become jammed and will not properly follow the gate, then hydraulic pressure is applied through the fitting 44 on that side of valve whereby the plungers 31 apply forces to the jammed ring to dislodge it and cause it to return to its proper operating position against the gate.

I claim:

1. In a fluid flow control valve, a body having aligned flow passages and a space located between the passages, a valve member disposed in said body space and movable between open and closed positions relative to the passages, valve seat rings interposed between each side of the valve member and the adjacent inner end portions of the corresponding flow passages, means forming fluid seals between said seat rings and the adjacent inner end portions of the flow passages, said seat rings being capable of limited movement relative to the body whereby said valve member is capable of limited movement in opposite directions together with said seat rings, a plurality of rigid hydraulic rams carried by each of said inner end portions, said rams being angularly spaced about the axis of said passages and disposed to act upon said seat rings to urge the seat rings toward the valve member, first hydraulic fluid means connected to urge the hydraulic rams of one of said inner end portions against its associated seat ring, second hydraulic fluid means connected to urge the hydraulic rams of the other of said inner end portions against its associated seat ring, and means for interconnecting said first and second hydraulic fluid means whereby hydraulic fluid displaced by movement of the rams of one inner end portion in one direction is utilized for moving the rams of the other inner end portion in the same direction.

2. In a fluid flow control valve, a body having hubs for making connection with associated piping, the hubs serving to define aligned flow passages, a valve gate disposed within the body and movable between open and closed positions relative to the passages, seat rings interposed between each side of the gate and the adjacent inner end of the corresponding hub, means forming fluid seals between each of said seat rings and the inner end portions of the hubs, said seat rings being capable of limited movement relative to the body whereby said gate is capable of limited movement in opposite directions together with said seat rings, a plurality of angularly spaced and cylindrical bores located in the inner end portions of the hubs and aligned with the axis of said passages, pistons fitted within said bores and disposed to apply thrust to the seat rings to urge the seat rings against the gate, first hydraulic piping means connecting the bores located in one of said inner end portions, second hydraulic piping means connecting the bores located in the other of said inner end portions, throttling means interconnecting said first and second piping means and means for applying hydraulic fluid under pressure to said bores.

3. A valve as in claim 1 wherein said interconnecting means includes a flow control between the hydraulic rams located in each inner end portion.

References Cited in the file of this patent

UNITED STATES PATENTS

| | | |
|---|---|---|
| 1,476,344 | McGee | Dec. 4, 1923 |
| 1,506,021 | McGee | Aug. 26, 1924 |
| 2,030,458 | McKellar | Feb. 11, 1936 |
| 2,370,751 | Prager | Mar. 6, 1945 |
| 2,642,942 | Reynolds | June 23, 1953 |
| 2,725,077 | Nicholl | Nov. 29, 1955 |
| 2,726,842 | Seamark | Dec. 13, 1955 |
| 2,747,600 | Laurent | May 29, 1956 |
| 2,796,230 | Grove | June 18, 1957 |
| 2,810,543 | Bryant | Oct. 22, 1957 |
| 2,864,312 | Shelton | Dec. 16, 1958 |

FOREIGN PATENTS

| | | |
|---|---|---|
| 868,864 | France | Jan. 19, 1942 |